United States Patent Office 2,875,197
Patented Feb. 24, 1959

2,875,197
$\Delta^{22}$-3-$\beta$-ACYLOXY-8,9-$\alpha$-OXIDO-7,11-DIKETO-ERGOSTENES Bernard W. Wildi, Dayton, Ohio, assignor to Monsanto Chemical Company, St. Louis, Mo., a corporation of Delaware No Drawing. Application April 27, 1953
Serial No. 351,483

9 Claims. (Cl. 260—239.55)

This invention relates to the manufacture of $\Delta^{22}$-3-$\beta$-acyloxy-8,9-$\alpha$-oxido-7,11-diketo-ergostenes. In a particular aspect the invention pertains to the controlled oxidation of $\Delta^{8,22}$-3-$\beta$-acyloxy-7$\xi$,11-$\alpha$-dihydroxy-ergostadienes.

The present invention is concerned with the following reaction:

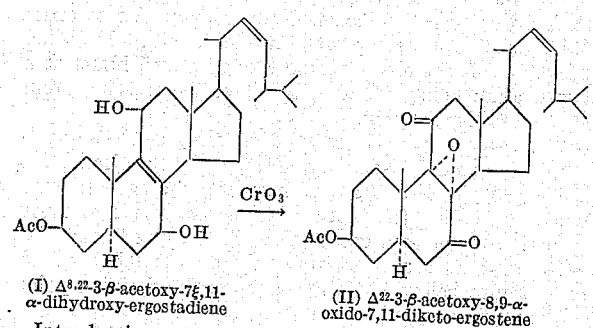

(I) $\Delta^{8,22}$-3-$\beta$-acetoxy-7$\xi$,11-$\alpha$-dihydroxy-ergostadiene (II) $\Delta^{22}$-3-$\beta$-acetoxy-8,9-$\alpha$-oxido-7,11-diketo-ergostene Introduction of the 11-keto group into steroid molecules is quite difficult. However, a number of physiologically active steroids contain the 11-keto group and accordingly it is important to have available methods for introducing this group with reasonably high yields. The present invention provides a method of introducing the 11-keto group into the ergosterol nucleus. In carrying out this invention the 7-keto group is likewise introduced into the ergosterol nucleus; this 7-keto group can either be removed by subsequent reactions where the 11-keto group alone is desired, or the 7,11 diketo compound can be utilized by other types of reactions which do not destroy the 7-keto group. My invention provides a straight-forward method of making $\Delta^{22}$-3-$\beta$-acetoxy-8,9-$\alpha$-oxido-7,11-diketo-ergostene which is convertible by known series of reactions to cortisone.

I have found that the reaction set forth above can only be effected if extremely mild oxidation conditions are used. Repeated attempts to effect the chromic acid oxidation of (I) yielded reaction mixtures from which no (II) could be isolated. The reaction conditions were 24 hours at room temperature, which would be expected from the art to give the desired reaction. In view of the failure of the conversion, the reaction period was increased to 36 hours in hopes of obtaining some of the diketo derivative as oxidation product. However, this was unsuccessful and in fact infrared analysis showed the presence of carboxyl groups indicating that degradation of the molecule was occurring. However, the reaction was found to proceed with good yields provided extremely mild oxidation conditions were employed.

In accordance with this invention, $\Delta^{8,22}$-3-$\beta$-acetoxy-7$\xi$,11-$\alpha$-dihydroxy-ergostadiene is subjected to chromic acid oxidation at temperatures below 20° C. for times not exceeding 6 hours. Preferably, the reaction time does not exceed 3 hours. The temperature is maintained below 20° C. and preferably below 17° C., but should not be below 10° C. Inasmuch as the chromic acid oxidation is best carried out in glacial acetic acid, the lower temperature limit is that determined by the freezing point of the reaction mixture, which will be in the neighborhood of 10 to 15° C. If desired, solvents other than acetic acid can be used, for example other fatty acids such as propionic, butyric, etc.

Example 1

A solution of 139 mg. of $\Delta^{8,22}$-3-$\beta$-acetoxy-7$\xi$,11-$\alpha$-dihydroxy-ergostadiene dissolved in 52 ml. of a chromic acid-acetic acid solution (containing 0.483 mg. of active oxygen per milliliter and 10 drops of 2 N sulfuric acid, and prepared from glacial acetic acid) was kept at room temperature for 24 hours. On working up the reaction mixture by ether extraction only 2.7 mg. of crystalline material was obtained. This had a constant melting point of 125–126° C. when recrystallized from acetone, and showed an ultraviolet absorption maximum at 267 mu, indicating $\Delta^{8,22}$-3-$\beta$-acetoxy-7,11-diketo-ergostadiene. The attempted oxidation was repeated on 93 mg. of $\Delta^{8,22}$-3-$\beta$-acetoxy-7$\xi$,11-$\alpha$-dihydroxy-ergostadiene yielding 15.5 mg. of $\Delta^{8,22}$-3-$\beta$-acetoxy-7,11-diketo-ergostadiene, with a melting point of 118–120° C.

Still further attempts to effect the oxidation at room temperature for 24 hours were unsuccessful.

Example 2

The foregoing attempted oxidation was repeated, but using a time of 36 hours. The oily reaction product could not be crystallized. No keto groups were found, and a study of the infrared absorption spectrum of the oil showed that degradation of the sterol to carboxylic acids had occurred.

Example 3

Five hundred milligrams of $\Delta^{8,22}$-3-$\beta$-acetoxy-7$\xi$,11-$\alpha$-dihydroxy-ergostadiene was dissolved in 100 ml. of glacial acetic acid and the solution was cooled to 15° C. A solution of 500 mg. of chromic anhydride ($CrO_3$) was dissolved in 100 ml. of glacial acetic acid which contained 0.5 ml. of 2 N sulfuric acid, and the resulting solution was added to the sterol solution. After 6 hours at 15° C. the reaction was stopped by freezing to 0° C. The frozen material was kept overnight (15 hours), then the excess chromic acid was destroyed with methanol (50 ml.). The resulting sterol-acetic acid mixture was poured into 1 liter of water. The crude sterol was collected by filtration and recrystallized from methanol to yield 80.3 mg. (16 percent yield) of $\Delta^{22}$-3-$\beta$-acetoxy-8,9-$\alpha$-oxido-7,11-diketo-ergostene, melting point 114–121° C. On recrystallization from acetone, pure material was obtained having a melting point of 125–126° C. The pure $\Delta^{22}$-3-$\beta$-acetoxy-8,9-$\alpha$-oxido-7,11-diketo-ergostene showed no absorption maxima in the ultraviolet region.

Example 4

The oxidation described in Example 3 was repeated on 2.11 grams of $\Delta^{8,22}$-3-$\beta$-acetoxy-7$\xi$,11-$\alpha$-dihydroxy-ergostadiene, using 2.00 grams of chromic anhydride. The reaction conditions were 16° C. for 2.5 hours. The oxidation mixture was worked up as described in Example 3 and yielded 0.7165 gram (34 percent yield) of crude $\Delta^{22}$-3-$\beta$-acetoxy-8,9-$\alpha$-oxido-7,11-diketo-ergostene, melting point 84–89° C. Three recrystallizations from methanol-water solution yielded a fairly pure product, melting point 121–122° C.

Example 5

A sample of 0.2158 gram of $\Delta^{22}$-3-$\beta$-acetoxy-8,9-$\alpha$-oxido-7,11-diketo-ergostene, obtained by the oxidations described in Examples 3 and 4 above, was dissolved in 25 ml. of glacial acetic acid and treated at reflux temperature with 750 mg. of purified zinc dust over a period of 1 hour. The mixture was cooled to room temperature and filtered. The filtrate was poured into 125 ml. of water and the precipitate was filtered and recrystallized from acetone to yield 0.1632 gram of $\Delta^{22}$-3-$\beta$-acetoxy-7,11-diketo-ergostene, melting point 188–192° C.

Example 5 above illustrates one procedure for converting the oxido-diketone product into another useful product, i. e., the 7,11-diketo-ergostene derivative. Retention of the double bond in the side chain at the 22-position allows the later degradation of the side chain during a series of steps to convert the material ultimately into cortisone.

The starting material which is oxidized in accordance with this invention, i. e., $\Delta^{8,22}$-3-$\beta$-acetoxy-7$\xi$,11-$\alpha$-dihydroxy-ergostadiene, can be obtained in any known manner. Thus, ergosteryl acetate is converted by mercuric acetate to dehydroergosteryl acetate, which upon oxidation gives the peroxide which in turn upon reduction with zinc dust, ethyl alcohol and KOH yields $\Delta^{7,9(11)22}$-3-$\beta$-5$\xi$-dihydroxy-ergostatriene. This material can then be acetylated with acetic anhydride followed by epoxidation to $\Delta^{7,22}$-3-$\beta$-acetoxy-9,11-$\alpha$-oxido-ergostadiene. This oxido derivative is hydrolyzed by aqueous acid to $\Delta^{8,22}$-3-$\beta$-acetoxy-7$\xi$,11-$\alpha$-dihydroxy-ergostadiene, which is the starting material of this invention.

While the invention has been described with particular reference to treatment of the 3-$\beta$-acetoxy derivative, those skilled in the art will appreciate that the 3-hydroxy group can be protected by other esterifying groups than acetyl. The 3-hydroxy group can be esterified with any suitable acid to form the corresponding 3-acyloxy derivative, for example the propionate, benzoate, succinate, etc. Thus, the invention is broadly applicable to the oxidation of $\Delta^{8,22}$-3-$\beta$-acyloxy-7$\xi$,11-$\alpha$-dihydroxy-ergostadienes to form $\Delta^{22}$-3-$\beta$-acyloxy-8,9-$\alpha$-oxido-7,11-diketo-ergostenes.

I claim:

1. The chromic acid oxidation of a $\Delta^{8,22}$-3-$\beta$-acyloxy-7$\xi$,11-$\alpha$-dihydroxy-ergostadiene at temperatures below 20° C. but above the freezing point of the reaction mixture for times not exceeding 6 hours forming the corresponding $\Delta^{22}$-3-$\beta$-acyloxy-8,9-$\alpha$-oxido-7,11-diketo-ergostene the amount of chromic acid being sufficient therefor.

2. The chromic acid oxidation of a $\Delta^{8,22}$-3-$\beta$-acetoxy-7$\xi$,11-$\alpha$-dihydroxyergostadiene at temperatures below 17° C. but not below 10° C. for times not exceeding 3 hours forming the corresponding $\Delta^{22}$-3-$\beta$-acetoxy-8,9-$\alpha$-oxido-7,11-diketo-ergostene the amount of chromic acid being sufficient therefor.

3. A process which comprises dissolving $\Delta^{8,22}$-3-$\beta$-acetoxy-7$\xi$,11-$\alpha$-dihydroxy-ergostadiene in a mixture of glacial acetic acid and $CrO_3$ containing a small quantity of sulfuric acid, and maintaining the resulting solution at a combination of a temperature below 20° C. and above the freezing point of the solution and a reaction time not over 6 hours giving a yield of at least 30 weight percent of crude $\Delta^{22}$-3-$\beta$-acetoxy-8,9-$\alpha$-oxido-7,11-diketo-ergostene, the amount of $CrO_3$ being sufficient to cause oxidation to the said ergostene.

4. The process of claim 3 in which the amount of $CrO_3$ is approximately equal in weight to the said ergostadiene.

5. A process which comprises forming a $\Delta^{22}$-3-$\beta$-acyloxy-8,9-$\alpha$-oxido-7,11-diketo-ergostene by subjecting a $\Delta^{8,22}$-3-$\beta$-acyloxy-7$\xi$,11-$\alpha$-dihydroxy-ergostadiene to the oxidative action of sufficient chromic anhydride to cause oxidation to the said ergostene while dissolved in a solvent for a reaction time of not over 3 hours at a temperature below 17° C. and above the freezing point of the resulting solution.

6. A process which comprises forming a $\Delta^{22}$-3-$\beta$-acyloxy-8,9-$\alpha$-oxido-7,11-diketo-ergostene by subjecting a $\Delta^{8,22}$-3-$\beta$-acyloxy-7$\xi$,11-$\alpha$-dihydroxy-ergostadiene to the oxidative action of sufficient chromic anhydride to cause oxidation to the said ergostene while dissolved in glacial acetic acid for a reaction time of not over 6 hours at a temperature below 17° C. and above the freezing point of the resulting solution.

7. A process which comprises forming a $\Delta^{22}$-3-$\beta$-acetoxy-8,9-$\alpha$-oxido-7,11-diketo-ergostene by subjecting a $\Delta^{8,22}$-3-$\beta$-acetoxy-7$\xi$,11-$\alpha$-dihydroxy-ergostadiene to the oxidative action of sufficient chromic anhydride to cause oxidation to the said ergostene while dissolved in glacial acetic acid for a reaction time of not over 6 hours at a temperature below 17° C. and above the freezing point of the resulting solution.

8. A process which comprises forming a $\Delta^{22}$-3-$\beta$-acyloxy-8,9-$\alpha$-oxido-7,11-diketo-ergostene by subjecting a $\Delta^{8,22}$-3-$\beta$-acyloxy-7$\xi$,11-$\alpha$-dihydroxy-ergostadiene to the oxidative action of sufficient chromic anhydride to cause oxidation to the said ergostene while dissolved in glacial acetic acid for a reaction time of not over 3 hours at a temperature below 17° C. and above the freezing point of the resulting solution.

9. A process which comprises forming a $\Delta^{22}$-3-$\beta$-acetoxy-8,9-$\alpha$-oxido-7,11-diketo-ergostene by subjecting a $\Delta^{8,22}$-3-$\beta$-acetoxy-7$\xi$,11-$\alpha$-dihydroxy-ergostadiene to the oxidative action of sufficient chromic anhydride to cause oxidation to the said ergostene while dissolved in glacial acetic acid for a reaction time of not over 3 hours at a temperature below 17° C. but not below 10° C.

References Cited in the file of this patent

UNITED STATES PATENTS 2,831,857     Ruzicka et al. _____ Apr. 22, 1958

FOREIGN PATENTS 507,987     Belgium _____ June 21, 1952

OTHER REFERENCES

Heusser: Helv. Chem. Acta, volume 34, August 1951, pages 2106–2132.